United States Patent
Kim et al.

(10) Patent No.: US 12,401,278 B2
(45) Date of Patent: Aug. 26, 2025

(54) POWER LOSS PROTECTION INTEGRATED CIRCUIT USING LOW VOLTAGE CAPACITOR

(71) Applicant: FADU Inc., Seoul (KR)

(72) Inventors: Seonho Kim, Suwon-si (KR); Jinup Lim, Seoul (KR); Jongchul Chae, Hwaseong-si (KR); Kichang Jang, Seoul (KR)

(73) Assignee: FADU Inc., Seoul (KR)

( * ) Notice: Subject to any disclaimer, the term of this patent is extended or adjusted under 35 U.S.C. 154(b) by 0 days.

(21) Appl. No.: 18/351,860

(22) Filed: Jul. 13, 2023

(65) Prior Publication Data

US 2024/0136924 A1 Apr. 25, 2024
US 2024/0235392 A9 Jul. 11, 2024

Related U.S. Application Data

(60) Provisional application No. 63/419,042, filed on Oct. 25, 2022.

(30) Foreign Application Priority Data

Oct. 25, 2022 (KR) .................. 10-2022-0138651

(51) Int. Cl.
*H02M 3/158* (2006.01)
*G06F 1/30* (2006.01)
*H02M 1/32* (2007.01)

(52) U.S. Cl.
CPC ............. *H02M 3/158* (2013.01); *G06F 1/30* (2013.01); *H02M 1/32* (2013.01)

(58) Field of Classification Search
CPC ............. H02M 3/158; H02M 1/32; G06F 1/30
See application file for complete search history.

(56) References Cited

U.S. PATENT DOCUMENTS

2023/0344349 A1* 10/2023 Somani ............... H02M 1/0096

FOREIGN PATENT DOCUMENTS

| KR | 10-2010-0072174 A | 6/2010 |
|---|---|---|
| KR | 10-1587951 B1 | 1/2016 |
| KR | 10-2393577 B1 | 5/2022 |

OTHER PUBLICATIONS

Korean Notice of Allowance issued on Apr. 5, 2023 in corresponding Korean Patent application No. 10-2022-0138651 (3 pages in Korean).

* cited by examiner

*Primary Examiner* — Rexford N Barnie
*Assistant Examiner* — Thai H Tran
(74) *Attorney, Agent, or Firm* — NSIP Law

(57) ABSTRACT

Disclosed is a power loss protection integrated circuit. In the power loss protection integrated circuit, an interrupt device is arranged on an electrical path between an output terminal of a buck converter and a low voltage capacitor such that a flow of current to the low voltage capacitor is limited upon initial operation to ensure stability of an output voltage of the buck converter, and after the passage of a predetermined time, the interrupt device is fully turned on when a voltage of the low voltage capacitor is almost the same as the output voltage of the buck converter such that the voltage of the low voltage capacitor is electrically connected to the output voltage of the buck converter.

9 Claims, 4 Drawing Sheets

POWER LOSS PROTECTION INTEGRATED CIRCUIT USING LOW VOLTAGE CAPACITOR

CROSS-REFERENCE TO RELATED APPLICATIONS

This application claims the benefit under 35 USC § 119(e) of U.S. Provisional Application No. 63/419,042 filed on Oct. 25, 2022, and the benefit under 35 USC § 119(a) of Korean Patent Application No. 10-2022-0138651 filed on Oct. 25, 2022, in the Korean Intellectual Property Office, the entire disclosures of which are incorporated herein by reference for all purposes.

BACKGROUND OF THE INVENTION

1. Field of the Invention

The present invention relates to a power loss protection integrated circuit using a low voltage capacitor, and more specifically to a circuit for storing energy in a low voltage capacitor in a normal power supply state and utilizing the energy charged in the low voltage capacitor to supply emergency power to a main system when the power supply is cut off.

2. Description of the Related Art

In general, a memory system including memory devices and a memory controller operates when power is supplied from the outside. Thus, data being processed may be lost when the power supply to the memory system is unintentionally cut off. In order to cope with such an emergency situation, the memory system includes an auxiliary power supply that stores energy in a capacitor when power is normally supplied to the memory system, immediately detects a situation in which the power supply is cut off, and uses the energy pre-charged in the capacitor to supply emergency power.

High voltage capacitors such as electrolytic capacitors, tantalum capacitors, and ceramic capacitors are used in conventional auxiliary power supplies. The energy of a capacitor is proportional to the square of the voltage. The use of a high voltage capacitor maximizes the voltage to increase the total amount of energy. High voltage capacitors have a low capacitance per unit area and a high withstand voltage and are expensive. Accordingly, an auxiliary power supply using a high voltage capacitor should use a high voltage device. Further, since the high voltage device has its own very large size, the chip size increases, inevitably resulting in a complex design.

In an effort to solve the problem of auxiliary power supplies using high voltage capacitors, the present inventors have developed a power loss protection integrated circuit in which a buck/boost converter controller operates in buck mode in a normal power supply state such that a portion of the power is used to store energy in a low voltage capacitor and operates in boost mode when the power supply is cut off such that the energy charged in the low voltage capacitor is utilized to supply emergency power to a main system (Korean Patent Application No. 10-2022-0104603).

The power loss protection integrated circuit developed by the present inventors requires a buck/boost converter and a high current inductor. There is thus a need for a power loss protection integrated circuit using a low voltage capacitor with a simpler structure.

SUMMARY OF THE INVENTION

The present invention has been made in view of the problems of the prior art and is intended to provide a power loss protection integrated circuit in which an interrupt device is arranged on an electrical path between an output terminal of a buck converter and a low voltage capacitor such that a flow of current to the low voltage capacitor is limited upon initial operation to ensure stability of an output voltage of the buck converter, and after the passage of a predetermined time, the interrupt device is fully turned on when a voltage of the low voltage capacitor is almost the same as the output voltage of the buck converter such that the voltage of the low voltage capacitor is electrically connected to the output voltage of the buck converter.

A power loss protection integrated circuit according to one embodiment of the present invention is constructed to use an external low voltage capacitor as an emergency power source that supplies emergency power to a main system and includes: a current switching unit arranged on a first electrical path connecting between an external power source and the main system such that the first electrical path is maintained in a normal state in which input power is applied from the external power source and is interrupted in an emergency state in which the input power is interrupted; a buck converter unit including a buck converter switching circuit including two switching devices connected to one node connected to one end of an inductor and a buck converter controller operating as a buck converter in conjunction with the buck converter switching circuit and allowing an output terminal connected to the other end of the inductor to output an output voltage;

and a current control unit including an interrupt device arranged on a second electrical path connecting between the output terminal and the low voltage capacitor and controlling the amount of current flowing through the second electrical path to charge the low voltage capacitor.

In the power loss protection integrated circuit, the maximum allowable voltage applied to the low voltage capacitor may be higher than or equal to the maximum value of the output voltage.

In the power loss protection integrated circuit, the current control unit may supply a predetermined charging current to the low voltage capacitor to charge the low voltage capacitor when the voltage of the low voltage capacitor is lower than the output voltage in the normal state as long as the output voltage lies within a preset predetermined range.

In the power loss protection integrated circuit, the charging current may be lower than the maximum current that can flow through the second electrical path.

In the power loss protection integrated circuit, the current control unit may fully turn on the interrupt device when the voltage of the low voltage capacitor is in a predetermined voltage range where it closes to or equals to the output voltage in the normal state.

In the power loss protection integrated circuit, the current control unit may maintain the interrupt device fully turned on in the emergency state.

In the power loss protection integrated circuit, the current control unit may further include an interrupt device controller controlling the interrupt device.

In the power loss protection integrated circuit, the interrupt device may include a transistor.

The power loss protection integrated circuit may further include a capacitor voltage measurement unit measuring the voltage of the low voltage capacitor.

The features and advantages of the present invention will become apparent from the following description with reference to the accompanying drawings.

Prior to the detailed description of the invention, it should be understood that the terms and words used in the specification and the claims are not to be construed as having common and dictionary meanings but are construed as having meanings and concepts corresponding to the technical spirit of the present invention in view of the principle that the inventor can define properly the concept of the terms and words in order to describe his/her invention with the best method.

The power loss protection integrated circuit of the present invention is structured such that an input voltage is stepped down to store energy in a capacitor at a low voltage.

Due to this structure, the buck controller and its peripheral circuits can be designed as low voltage devices rather than high voltage devices. Therefore, the power loss protection integrated circuit of the present invention can contribute to a reduction in chip area, can be simplified in design, and can be protected in advance from defects caused by high voltages compared to conventional auxiliary power supplies using high voltage devices.

In addition, the power loss protection integrated circuit of the present invention can store energy in a low voltage capacitor in a normal power supply state even without a buck/boost converter and a high current inductor and can use the energy stored in the low voltage capacitor when the power supply is cut off.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
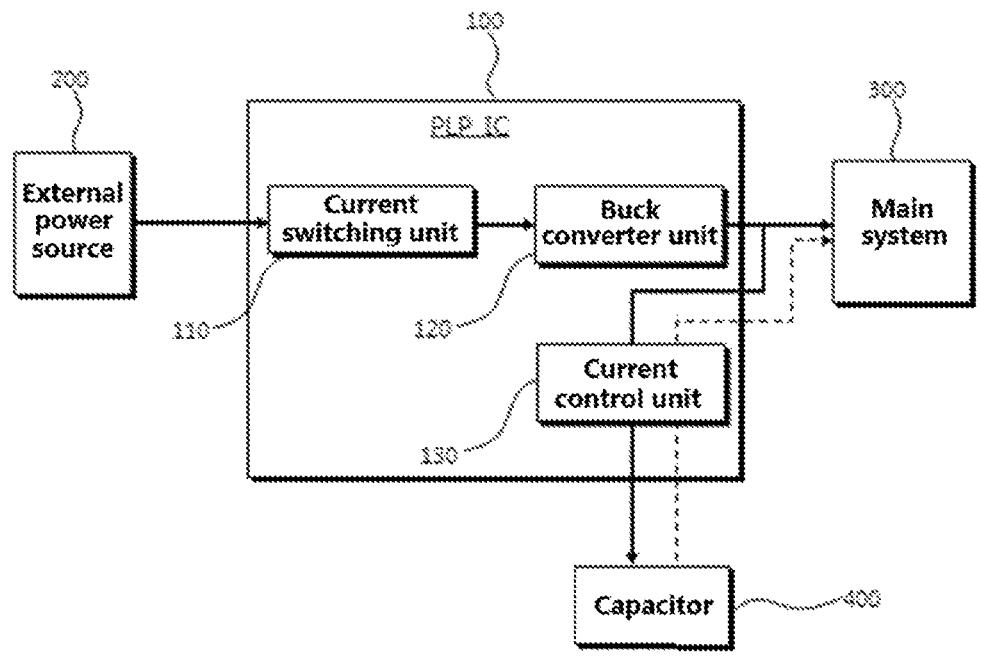
FIGS. 1 and 2 are schematic diagrams illustrating the configuration of a power loss protection integrated circuit according to an exemplary embodiment of the present invention.

The objects, specific advantages, and novel features of the present invention will become apparent from the following detailed description and preferred embodiments in conjunction with the accompanying drawings. It should be noted that in the drawings, the same components are denoted by the same reference numerals even though they are depicted in different drawings. Although such terms as "first" and "second," etc. may be used to describe various components, these components should not be limited by above terms. These terms are used only to distinguish one component from another. In the description of the present invention, detailed explanations of related art are omitted when it is deemed that they may unnecessarily obscure the essence of the present invention.

Preferred embodiments of the present invention will now be described in detail with reference to the accompanying drawings.

Figure 2:
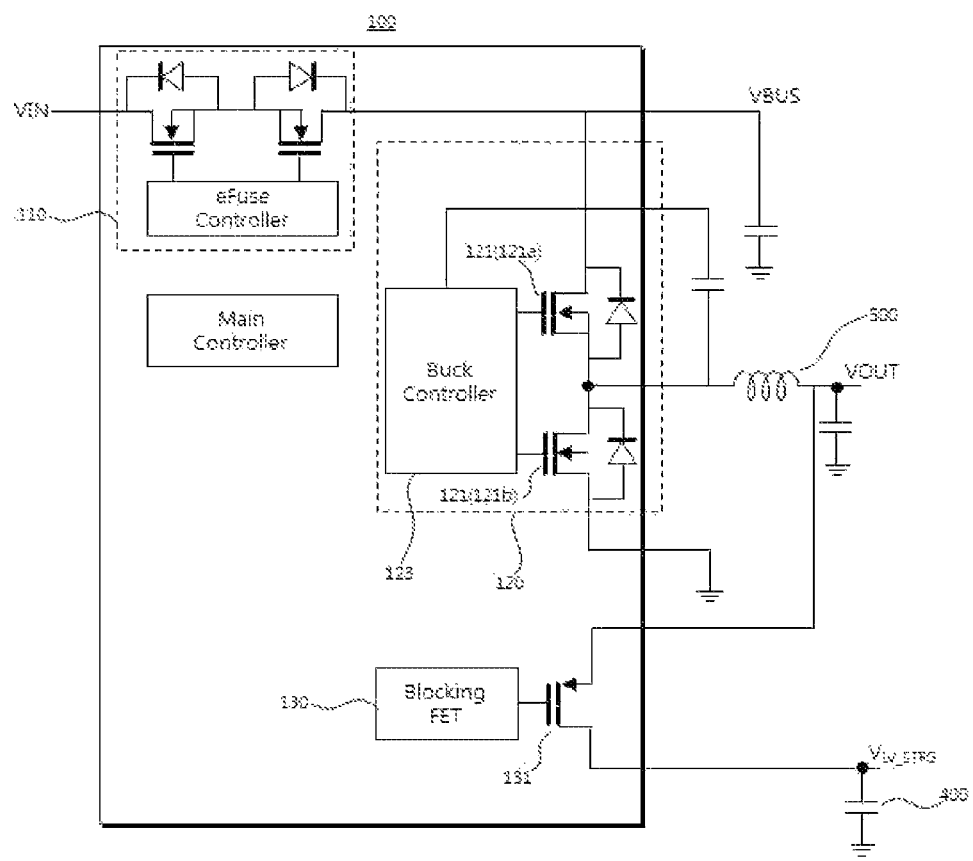
Figure 3:
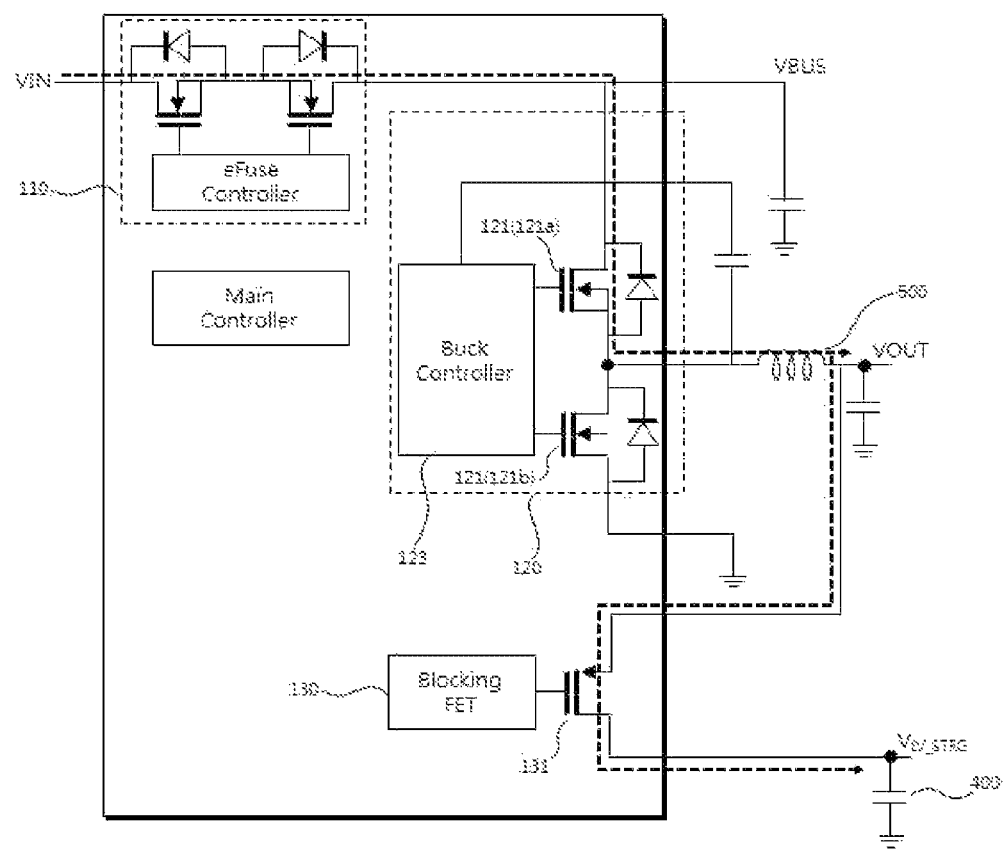
FIG. 3 illustrates the operation of the power loss protection integrated circuit according to the exemplary embodiment of the present invention in a normal state.
Figure 4:
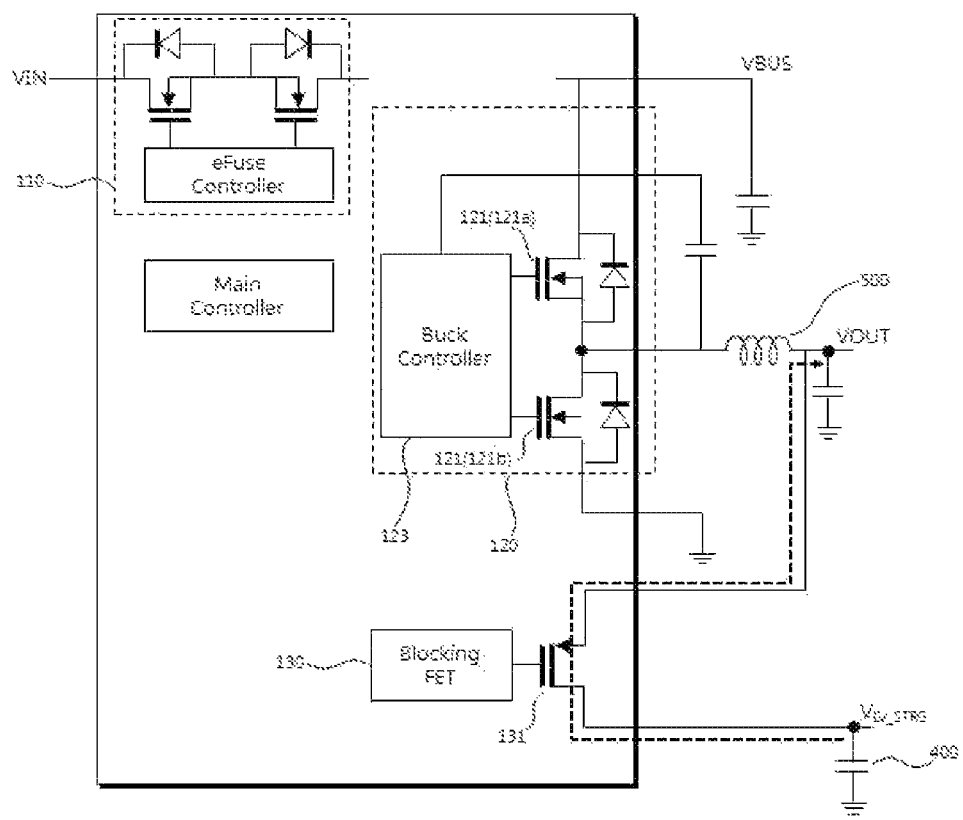
FIG. 4 illustrates the operation of the power loss protection integrated circuit according to the exemplary embodiment of the present invention in an emergency state.

FIGS. 1 and 2 are schematic diagrams illustrating the configuration of a power loss protection integrated circuit according to an exemplary embodiment of the present invention, FIG. 3 illustrates the operation of the power loss protection integrated circuit in a normal state, and FIG. 4 illustrates the operation of the power loss protection integrated circuit in an emergency state.

As illustrated in FIGS. 1 and 2, the power loss protection integrated circuit 100 is constructed to use an external low voltage capacitor 400 as an emergency power source that supplies emergency power to a main system 400 and includes: a current switching unit 110 arranged on a first electrical path connecting between an external power source 200 and the main system 400 such that the first electrical path is maintained in a normal state in which input power (VIN) is applied from the external power source 200 and is interrupted in an emergency state in which the input power (VIN) is interrupted; a buck converter unit 120 including a buck converter switching circuit 121 including two switching devices 121a and 121b connected to one node connected to one end of an inductor 500 and a buck converter controller 123 operating as a buck converter in conjunction with the buck converter switching circuit 121 and allowing an output terminal connected to the other end of the inductor 500 to output an output voltage (VOUT); and a current control unit 130 including an interrupt device 131 arranged on a second electrical path connecting between the output terminal and the low voltage capacitor 400 and controlling the amount of current flowing through the second electrical path to charge the low voltage capacitor 400.

The power loss protection integrated circuit 100 of the present invention stores energy in the capacitor 400 in a normal power supply state and utilizes the energy charged in the capacitor 400 to supply emergency power to the main system 300 when the power supply is cut off.

The main system 300 is an assembly of devices that receives power from the power loss protection integrated circuit 100 and performs a predetermined function. As an example, the main system 300 may be a solid state drive (SSD) or may consist of elements in the SSD. An SSD is a semiconductor-based storage device and may include a power loss protection integrated circuit that can supply emergency power to prevent data being processed from being lost even in an unintentional sudden power cut off situation. In this case, the power loss protection integrated circuit supplies power to a power management device such as a PMIC in an SSD and supports such that data are stably stored in a NAND flash memory.

The power loss protection integrated circuit 100 is an integrated circuit constructed such that power is supplied to the main system 300 and at the same time a portion of the power is used to store energy in the external capacitor 400 in a situation in which the power is normally supplied from the external power source 200 and the energy stored in the capacitor 400 is used to supply emergency power to the main system 300 in an emergency situation in which the power supply is cut off.

As described above, the power loss protection integrated circuit 100 of the present invention includes a current switching unit 110, a buck converter unit 120, and a current control unit 130.

The current switching unit 110 is arranged on a first electrical path connecting between the external power source 200 and the main system 300 to maintain or interrupt the first electrical path. The first electrical path is a path through which current flows. The current switching unit 110 can control the flow of electric current along the first electrical path. The first electrical path is maintained only in a normal state and allows current to flow therethrough. The normal state refers to a state in which an input voltage (VIN) is applied from the external power source 200. In this state, the power loss protection integrated circuit 100 outputs a predetermined voltage in response to an input voltage (VIN) and supplies the output as power to the main system 300. Meanwhile, the emergency state refers to a state in which power supply from the external power source 200 is unintentionally cut off. In response to the emergency state, the power loss protection integrated circuit 100 forces the current switching unit 110 to interrupt (deactivate) the first electrical path. When the first electrical path is interrupted, the flow of electric current is also interrupted, with the result that emergency power supplied by energy stored in the external capacitor 400 is prevented from being lost along the first electrical path.

The current switching unit 110 may include an electronic fuse (eFuse). An electronic fuse is an electronic switching device that controls the flow of electrical current when an installed MOSFET is turned ON/OFF. Although not illustrated, a circuit may be installed to detect whether power is supplied from the external power source 200. The circuit can detect power supply from the external power source 200 to generate a control signal and an electronic fuse (eFuse) controller can control the ON/OFF of the electronic fuse in response to the control signal. However, the current switching unit 110 is not necessarily implemented by an electronic fuse and is not particularly limited as long as it is a circuit capable of allowing or interrupting the flow of current.

As described above, the buck converter unit 120 includes a buck converter switching circuit 121 and a buck converter controller 123.

In the buck converter switching circuit 121, two switching devices 121a and 121b are connected to one node. One end of the inductor 500 is connected to the node to which the switching devices 121a and 121b are connected. The inductor 500 may be arranged outside the power loss protection integrated circuit 100. The switching devices 121a and 121b may be implemented by transistors, for example, two MOSFETs that are alternately turned ON/OFF. Parasitic diodes may be attached to the MOSFETs and a bootstrap capacitor may be electrically connected between the buck converter controller 123 and the one end of the inductor 500. An output terminal is connected to the other end of the inductor 500 to output a voltage, which is supplied as power to the main system 300.

The buck converter controller 123 controls the ON/OFF of the switching devices 121a and 121b and operates as a buck converter in buck mode in conjunction with the inductor 500 and the buck converter switching circuit 121.

The buck converter unit 120 operates as a buck converter only in a normal state and does not operate in an emergency state.

The buck converter is a converter that steps down an input voltage (VIN) and outputs the stepped-down voltage. The buck converter outputs a voltage lower than the input voltage (VIN). According to one embodiment of the present invention, the power loss protection integrated circuit 100 may use an output from the current switching unit 110 as power supplied to the main system 300 in a normal state. That is, the current switching unit 110 maintains the first electrical path in a normal state to supply the input voltage (VIN) as an input to the buck converter unit 120 and the buck converter unit 120 steps down the input voltage (VIN) into an output voltage (VOUT), which is used for power supply to the main system 300 and simultaneously uses a portion of the output voltage (VOUT) to charge the capacitor 400. Since the buck converter unit 120 operates as a buck converter in a normal state, a low voltage capacitor may be used as the capacitor 400. The low voltage capacitor may be, for example, a supercapacitor. Since the low voltage capacitor 400 is charged by the output voltage (VOUT) of the buck converter unit 120, the maximum allowable voltage applied to the low voltage capacitor 400 should be higher than or equal to the maximum value of the output voltage (VOUT). The maximum allowable voltage applied may be the rated voltage of the capacitor or may be determined taking into account the tolerance of the rated voltage.

When the maximum allowable voltage applied to the low voltage capacitor 400 is higher than or equal to the output voltage (VOUT), the same voltage as the output voltage (VOUT) of the buck converter unit 120 can be applied to the low voltage capacitor 400. In this case, a separate buck/boost converter is not necessary to generate the voltage of the low voltage capacitor 400, unlike in the prior art, thus making the internal circuits of the integrated circuit simple and contributing to a reduction in the number of external components such as inductors.

However, since a long operation time is required to charge the low voltage capacitor 400 with a voltage that is relatively high at the initial stage of operation, the output of the buck converter unit 120 and the voltage of the low voltage capacitor 400 need to be separated from each other. In an attempt to meet this need, the current control unit 130 is introduced into the power loss protection integrated circuit 100 of the present invention.

The current control unit 130 includes an interrupt device 131 that can control the flow or amount of current. The interrupt device 131 is arranged on a second electrical path connecting between the output terminal outputting the output voltage (VOUT) of the buck converter unit 120 and the low voltage capacitor 400 and controls the amount of current flowing along the second electrical path to charge the low voltage capacitor 400.

The interrupt device 131 may include a transistor. For example, the interrupt device 131 may use a PMOS. The interrupt device 131 can control the supplied current by regulating the gate-source voltage. The interrupt device 131 may be fully turned on such that the second electrical path corresponds to an electrically short state or may be fully turned off such that the second electrical path corresponds to an electrically open state. The interrupt device can also control such that a smaller amount of current than the maximum amount of current flowable in a fully turned-on state flows.

The current control unit 130 may further include an interrupt device controller (not illustrated) for current control of the interrupt device 131. The interrupt device controller may be configured as a circuit for applying a voltage to the gate of the transistor. However, the interrupt device controller does not necessarily have to be provided separately and its function may be performed by a main controller in the power loss protection integrated circuit 100. For example, the current control unit 130 may be implemented by a blocking field effect transistor (blocking FET).

A description will be given of the operation of the power loss protection integrated circuit 100.

Referring to FIG. 3, in a normal state in which an input voltage (VIN) is applied from the external power supply 200, the buck converter unit 120 steps down the input voltage (VIN), outputs an output voltage (VOUT), and supplies the output voltage as power to the main system 300. At the initial stage of operation where the voltage of the low voltage capacitor 400 is lower than the output voltage (VOUT), the current control unit 130 uses the output voltage (VOUT) to supply a small amount of current to the low voltage capacitor 400 and charge the low voltage capacitor 400. Charging of the low voltage capacitor 400 with a relatively high voltage ($V_{LV\text{-}STRG}$) upon initial operation requires a long operation time and supply of a large amount of current to the low voltage capacitor 400 makes the output voltage (VOUT) of the buck converter unstable. Accordingly, the current control unit 130 functions to limit the amount of current supplied to the low voltage capacitor 400. Here, the current is supplied to the low voltage capacitor 400 as long as the output voltage (VOUT) of the buck converter unit 120 is maintained stable.

In one embodiment, the current control unit 130 may supply a charging current to the low voltage capacitor 400 to charge the low voltage capacitor 400 as long as the output voltage (VOUT) lies within a preset predetermined range. The preset predetermined voltage range may be set to a range where stability of the output voltage (VOUT) can be guaranteed. For example, the predetermined voltage range may be set as long as the output voltage (VOUT) lies within a range that satisfies Inequality 1:

$$Vdv \times a \leq VOUT \leq Vdv \times b \quad \text{[Inequality 1]}$$

where VOUT is the output voltage, Vdv is the desired value of the output voltage, a is in the range of 50% to 100%, and b is in the range of 100% to 150%. The desired value of the output voltage is a voltage value corresponding to power necessary for stably driving the main system 300. However, a and b may also be determined outside the respective ranges defined above depending on the driving power of the main system 300.

The amount of the charging current supplied by the current control unit 130 is smaller than that of the maximum current that can flow through the second electrical path. That is, since the interrupt device 131 permits a flow of current when not fully turned on, the charging current can be provided by applying a voltage lower than the minimum threshold voltage applied to the gate for full turn-on of the interrupt device 131.

Meanwhile, when the voltage ($V_{LV\text{-}STRG}$) of the low voltage capacitor 400 is within a predetermined range in a normal state, the interrupt device 131 is fully turned on to connect the voltage ($V_{LV\text{-}STRG}$) of the low voltage capacitor 400 and the output voltage (VOUT) of the buck converter unit 120.

The predetermined voltage range is a voltage range in which the voltage ($V_{LV\text{-}STRG}$) of the low voltage capacitor 400 is close to or equal to the output voltage (VOUT) of the buck converter unit 120.

As an example, the voltage range for full turn-on of the interrupt device 131 satisfies the relation given by Inequality 2:

$$V_{OUT} \times c \leq V_{LV\text{-}STRG} \leq V_{OUT} \times d \quad \text{[Inequality 2]}$$

where $V_{LV\text{-}STRG}$ is the voltage of the low voltage capacitor 400, $V_{OUT}$ is the output voltage, c is in the range of 50% to 100%, and d is in the range of 100% to 150%. However, c and d are not necessarily limited to the respective ranges defined above and may also be determined otherwise.

Referring to FIG. 4, in response to an emergency state, the first electrical path is interrupted, the buck converter unit 120 is not operated, and the interrupt device 131 of the current control unit 130 is maintained fully turned on. The voltage ($V_{LV\text{-}STRG}$) of the low voltage capacitor 400 is connected to the output voltage (VOUT) in a normal state and this connection is maintained even in an emergency state. Thus, energy stored in the low voltage capacitor 400 can be used to supply emergency power to the main system 300 without the need to step down or up the voltage ($V_{LV\text{-}STRG}$) of the low voltage capacitor 400.

The current control unit 130 compares the output voltage (VOUT) of the buck converter unit 120 with the voltage ($V_{LV\text{-}STRG}$) of the low voltage capacitor 400 to perform current control. According to one embodiment of the present invention, the power loss protection integrated circuit 100 may further include a measurement unit (not illustrated) measuring the voltage ($V_{LV\text{-}STRG}$) of the low voltage capacitor 400. The measurement unit does not necessarily have to be configured as a separate circuit and may perform its function in a health check circuit. A circuit for measuring the output voltage (VOUT) of the buck converter unit 120 may also be provided in the power loss protection integrated circuit 100. Alternatively, the measurement circuit may be separately provided outside the power loss protection integrated circuit 100.

The current switching unit 110, the buck converter unit 120, and the current control unit 130 operate in conjunction with one another to respond to a normal or emergency state, and their entire operation can be controlled by the main controller.

Overall, the power loss protection integrated circuit is structured such that an input voltage is stepped down to store energy in a capacitor at a low voltage. Due to this structure, the buck controller and its peripheral circuits can be designed as low voltage devices rather than high voltage devices. Therefore, the power loss protection integrated circuit of the present invention can contribute to a reduction in chip area, can be simplified in design, and can be protected in advance from defects caused by high voltages compared to conventional auxiliary power supplies using high voltage devices. In addition, the power loss protection integrated circuit of the present invention can store energy in a low voltage capacitor in a normal power supply state even without a buck/boost converter and a high current inductor and can use the energy stored in the low voltage capacitor when the power supply is cut off.

Although the present invention has been described herein with reference to the specific embodiments, these embodiments do not serve to limit the invention and are set forth for illustrative purposes. It will be apparent to those skilled in the art that modifications and improvements can be made without departing from the spirit and scope of the invention.

Such simple modifications and improvements of the present invention belong to the scope of the present invention, and the specific scope of the present invention will be clearly defined by the appended claims.

EXPLANATION OF REFERENCE NUMERALS

100: Power loss protection integrated circuit
110: Current switching unit
120: Buck converter unit
121: Buck converter switching circuit
121a, 121b: Switching devices
123: Buck converter controller
130: Current control unit
131: Interrupt device
200: External power source
300: Main system
400: Capacitor
500: Inductor

What is claimed is:

1. A power loss protection integrated circuit configured to use an external low voltage capacitor as an emergency power source that supplies emergency power to a main system and comprising:
   a current switching unit placed in a first electrical path connected between an external power source and a main system and configured such that the first electrical path is maintained in a normal state in which input power is applied from the external power source and is interrupted in an emergency state in which the input power is cut off;
   a buck converter unit comprising:
      a buck converter switching circuit comprising two switching devices connected between an output node of the current switching unit and one end of an inductor; and
      a buck converter controller operating as a buck converter in conjunction with the buck converter switching circuit and configured to allow an output terminal connected to the other end of the inductor to output an output voltage; and
   a current control unit comprising an interrupt device placed in a second electrical path connected between the output terminal and the low voltage capacitor and controlling an amount of current flowing through the second electrical path to charge the low voltage capacitor,
   wherein the current control unit comprising the interrupt device is configured to fully turn on the interrupt device when a voltage of the low voltage capacitor is within a predetermined voltage range that is close to or equal to the output voltage in the normal state.

2. The power loss protection integrated circuit according to claim 1,
   wherein a maximum allowable voltage supplied to the low voltage capacitor is greater than or equal to a maximum value of the output voltage.

3. The power loss protection integrated circuit according to claim 1,
   wherein the current control unit comprising the interrupt device is configured to supply a predetermined charging current to the low voltage capacitor to charge the low voltage capacitor when the voltage of the low voltage capacitor is lower than the output voltage in the normal state as long as the output voltage is within a preset range.

4. The power loss protection integrated circuit according to claim 3,
   wherein the predetermined charging current is lower than a maximum current that flows through the second electrical path.

5. The power loss protection integrated circuit according to claim 1,
   wherein the current control unit comprising the interrupt device further comprises a blocking field effect transistor (blocking FET) configured to control the interrupt device.

6. The power loss protection integrated circuit according to claim 5,
   wherein the current control unit comprising the interrupt device is configured to keep the interrupt device fully turned on in the emergency state.

7. The power loss protection integrated circuit according to claim 1,
   wherein the current control unit comprising the interrupt device further comprises an interrupt device controller configured to control the interrupt device.

8. The power loss protection integrated circuit according to claim 1, wherein the interrupt device comprises a transistor.

9. The power loss protection integrated circuit according to claim 1, further comprising:
   a capacitor voltage measurement unit configured to measure a voltage of the low voltage capacitor.

* * * * *